United States Patent
Webster (10) Patent No.: US 8,156,467 B2
(45) Date of Patent: Apr. 10, 2012

(54) REUSING COMPONENTS IN A RUNNING APPLICATION

(75) Inventor: Roger Webster, San Martin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1088 days.

(21) Appl. No.: 11/845,703

(22) Filed: Aug. 27, 2007

(65) Prior Publication Data

US 2009/0064106 A1    Mar. 5, 2009

(51) Int. Cl.
G06F 9/44    (2006.01)

(52) U.S. Cl. ........................ 717/105; 717/113

(58) Field of Classification Search .............. 717/105, 717/113
See application file for complete search history.

(56) References Cited

U.S. PATENT DOCUMENTS

| | | |
|---|---|---|
| 4,752,893 A | 6/1988 | Guttag et al. |
| 5,168,441 A | 12/1992 | Onarheim et al. |
| 5,289,574 A | 2/1994 | Sawyer |
| 5,297,250 A | 3/1994 | Leroy et al. |
| 5,357,603 A | 10/1994 | Parker |
| 5,388,201 A | 2/1995 | Hourvitz et al. |
| 5,481,665 A | 1/1996 | Okada et al. |
| 5,490,246 A | 2/1996 | Brotsky et al. |
| 5,522,022 A | 5/1996 | Rao et al. |
| 5,537,630 A | 7/1996 | Berry et al. |
| 5,564,002 A | 10/1996 | Brown |
| 5,588,098 A | 12/1996 | Chen et al. |
| 5,602,997 A | 2/1997 | Carpenter et al. |
| 5,638,501 A | 6/1997 | Gough et al. |
| 5,651,107 A | 7/1997 | Frank et al. |
| 5,731,819 A | 3/1998 | Gagne et al. |
| 5,742,285 A | 4/1998 | Ueda |
| 5,764,229 A | 6/1998 | Bennett |
| 5,764,238 A | 6/1998 | Lum et al. |
| 5,793,376 A | 8/1998 | Tanaka et al. |
| 5,796,402 A | 8/1998 | Ellison-Taylor |

(Continued)

FOREIGN PATENT DOCUMENTS

EP    548586    6/1993

(Continued)

OTHER PUBLICATIONS

Adobe Creative Team, "Adobe GoLive Classroom in a Book"; Adobe Press (Aug. 16, 2004).*

(Continued)

*Primary Examiner* — Lewis A Bullock, Jr
*Assistant Examiner* — Kevin Dothager
(74) *Attorney, Agent, or Firm* — Fish & Richardson P.C.

(57) ABSTRACT

Methods, systems, and apparatus, including computer program products, for reusing a component. In one aspect, a method includes executing a source application in an application environment; presenting a reusable component in a source application window corresponding to the source application, wherein the reusable component is visibly distinguishable from one or more non-reusable components displayed in the source application window; receiving input selecting the reusable component in the source application window and adding the reusable component to a target application window corresponding to a target application; and inserting one or more computer-readable instructions associated with the reusable component into the target application. Further, input can be received to activate a reuse function associated with the source application. Additionally, the reusable component can be visibly distinguishable from one or more non-reusable components displayed in the source application window only when the reuse function is active.

24 Claims, 7 Drawing Sheets

U.S. PATENT DOCUMENTS

| | | |
|---|---|---|
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,877,741 A | 3/1999 | Chee et al. |
| 5,877,762 A | 3/1999 | Young |
| 5,883,639 A | 3/1999 | Walton et al. |
| 5,913,063 A | 6/1999 | McGurrin et al. |
| 5,920,659 A | 7/1999 | Iverson et al. |
| 5,933,148 A | 8/1999 | Oka et al. |
| 5,949,409 A | 9/1999 | Tanaka et al. |
| 5,978,579 A | 11/1999 | Buxton et al. |
| 6,005,568 A | 12/1999 | Simonoff et al. |
| 6,006,231 A | 12/1999 | Popa |
| 6,011,562 A | 1/2000 | Gagne et al. |
| 6,031,937 A | 2/2000 | Graffagnino |
| 6,045,446 A | 4/2000 | Ohshima |
| 6,075,543 A | 6/2000 | Akeley |
| 6,128,010 A | 10/2000 | Baxter et al. |
| 6,144,381 A | 11/2000 | Lection et al. |
| 6,154,601 A | 11/2000 | Yaegashi et al. |
| 6,166,748 A | 12/2000 | Van Hook et al. |
| 6,191,797 B1 | 2/2001 | Politis |
| 6,195,664 B1 | 2/2001 | Tolfa |
| 6,211,890 B1 | 4/2001 | Ohba |
| 6,246,418 B1 | 6/2001 | Oka |
| 6,266,053 B1 | 7/2001 | French et al. |
| 6,266,430 B1 | 7/2001 | Rhoads |
| 6,272,484 B1 | 8/2001 | Martin et al. |
| 6,272,558 B1 | 8/2001 | Hui et al. |
| 6,278,448 B1 | 8/2001 | Brown et al. |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,321,314 B1 | 11/2001 | Van Dyke |
| 6,353,437 B1 | 3/2002 | Gagne |
| 6,356,903 B1 | 3/2002 | Baxter et al. |
| 6,369,823 B2 | 4/2002 | Ohba |
| 6,369,830 B1 | 4/2002 | Brunner et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh et al. |
| 6,427,230 B1 * | 7/2002 | Goiffon et al. ................. 717/108 |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,469,714 B2 | 10/2002 | Buxton et al. |
| 6,483,524 B1 | 11/2002 | Petchenkine et al. |
| 6,489,963 B2 | 12/2002 | Parikh et al. |
| 6,512,522 B1 | 1/2003 | Miller et al. |
| 6,525,736 B1 | 2/2003 | Erikawa et al. |
| 6,526,174 B1 | 2/2003 | Graffagnino |
| 6,542,160 B1 | 4/2003 | Abgrall |
| 6,542,166 B1 | 4/2003 | Washington et al. |
| 6,571,328 B2 | 5/2003 | Liao et al. |
| 6,573,896 B1 | 6/2003 | Ribadeau Dumas et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,639,595 B1 | 10/2003 | Drebin et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,687,745 B1 | 2/2004 | Franco et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,715,053 B1 | 3/2004 | Grigor |
| 6,717,599 B1 | 4/2004 | Olano |
| 6,734,864 B2 | 5/2004 | Abgrall |
| 6,765,592 B1 | 7/2004 | Pletcher et al. |
| 6,788,318 B2 | 9/2004 | Chen |
| 6,806,892 B1 | 10/2004 | Plow et al. |
| 6,906,720 B2 | 6/2005 | Emberling et al. |
| 6,910,000 B1 | 6/2005 | Yedidia et al. |
| 6,911,984 B2 | 6/2005 | Sabella et al. |
| 6,931,633 B1 | 8/2005 | Vazquez et al. |
| 6,944,829 B2 | 9/2005 | Dando |
| 6,985,939 B2 * | 1/2006 | Fletcher et al. ................. 709/223 |
| 6,993,721 B2 | 1/2006 | Rosin et al. |
| 7,016,011 B2 | 3/2006 | De Haan |
| 7,027,055 B2 | 4/2006 | Anderson et al. |
| 7,050,955 B1 | 5/2006 | Carmel et al. |
| 7,337,409 B2 | 2/2008 | Doblmayr et al. |
| 7,496,888 B2 * | 2/2009 | Sanjar et al. .................. 717/105 |
| 7,644,391 B2 * | 1/2010 | Fisher et al. .................. 717/109 |
| 2001/0030647 A1 | 10/2001 | Sowizral et al. |
| 2001/0035885 A1 | 11/2001 | Iron et al. |
| 2002/0065946 A1 | 5/2002 | Narayan |
| 2002/0067418 A1 | 6/2002 | Hiroaki |
| 2002/0078453 A1 | 6/2002 | Kuo |
| 2002/0087660 A1 | 7/2002 | Martin et al. |
| 2002/0089526 A1 | 7/2002 | Buxton et al. |
| 2002/0093516 A1 | 7/2002 | Brunner et al. |
| 2002/0112180 A1 | 8/2002 | Land et al. |
| 2002/0118217 A1 | 8/2002 | Fujiki |
| 2002/0120673 A1 | 8/2002 | Tolson et al. |
| 2002/0129092 A1 | 9/2002 | Tolson et al. |
| 2002/0140740 A1 | 10/2002 | Chen |
| 2002/0171682 A1 | 11/2002 | Frank et al. |
| 2002/0174181 A1 | 11/2002 | Wei |
| 2002/0186257 A1 | 12/2002 | Cadiz et al. |
| 2003/0005412 A1 | 1/2003 | Eanes |
| 2003/0008711 A1 | 1/2003 | Corbo |
| 2003/0020671 A1 | 1/2003 | Santoro et al. |
| 2003/0046316 A1 | 3/2003 | Gergic et al. |
| 2003/0067489 A1 | 4/2003 | Wong et al. |
| 2003/0080995 A1 | 5/2003 | Tenenbaum et al. |
| 2003/0123739 A1 | 7/2003 | Graffagnino |
| 2003/0146934 A1 | 8/2003 | Bailey et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0189597 A1 | 10/2003 | Anderson et al. |
| 2004/0012626 A1 | 1/2004 | Brookins |
| 2004/0032409 A1 | 2/2004 | Girard |
| 2004/0036711 A1 | 2/2004 | Anderson |
| 2004/0039934 A1 | 2/2004 | Land et al. |
| 2004/0056896 A1 | 3/2004 | Doblmayr et al. |
| 2004/0179019 A1 | 9/2004 | Sabella et al. |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0060655 A1 | 3/2005 | Gray et al. |
| 2005/0060661 A1 | 3/2005 | Kawahara et al. |
| 2005/0088447 A1 | 4/2005 | Hanggie et al. |
| 2005/0088452 A1 | 4/2005 | Hanggie et al. |
| 2005/0144563 A1 | 6/2005 | Hough et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0193368 A1 | 9/2005 | Becker et al. |
| 2005/0215310 A1 | 9/2005 | Boyd et al. |
| 2005/0229190 A1 | 10/2005 | Peters et al. |
| 2005/0240857 A1 | 10/2005 | Benedict et al. |
| 2005/0256940 A1 | 11/2005 | Henderson et al. |
| 2005/0278651 A1 | 12/2005 | Coe et al. |
| 2005/0282612 A1 | 12/2005 | Mathews |
| 2005/0283734 A1 | 12/2005 | Santoro et al. |

| | | | |
|---|---|---|---|
| 2006/0064674 A1 | 3/2006 | Olson et al. | |
| 2006/0075106 A1 | 4/2006 | Hochmuth et al. | |
| 2006/0075141 A1 | 4/2006 | Boxenhorn | |
| 2006/0089840 A1 | 4/2006 | May | |
| 2006/0123356 A1 | 6/2006 | Sobeski et al. | |
| 2006/0218499 A1 | 9/2006 | Matthews | |
| 2006/0294498 A1 | 12/2006 | Partamian | |
| 2007/0038934 A1 | 2/2007 | Fellman | |
| 2007/0044029 A1 | 2/2007 | Fischer et al. | |
| 2007/0044039 A1 | 2/2007 | Amadio et al. | |
| 2007/0061724 A1 | 3/2007 | Slothouber et al. | |
| 2007/0074126 A1 | 3/2007 | Fisher et al. | |
| 2007/0074157 A1 | 3/2007 | Worden et al. | |
| 2007/0101291 A1 | 5/2007 | Forstall et al. | |
| 2007/0157101 A1 | 7/2007 | Indiran et al. | |
| 2007/0203984 A2 | 8/2007 | AlHusseini et al. | |
| 2007/0209013 A1 | 9/2007 | Ramsey et al. | |
| 2007/0234195 A1* | 10/2007 | Wells | 715/501.1 |
| 2008/0155518 A1 | 6/2008 | Van et al. | |
| 2008/0248834 A1 | 10/2008 | Chatterjee et al. | |

FOREIGN PATENT DOCUMENTS

| | | |
|---|---|---|
| EP | 0694879 | 1/1996 |
| EP | 1383080 | 1/2004 |
| EP | 0972273 | 3/2004 |
| WO | WO98/45815 | 10/1998 |
| WO | WO02/09039 | 1/2002 |
| WO | WO2004/027707 | 4/2004 |

OTHER PUBLICATIONS

Muller, "How Microsoft Windows Vista Works," Que, pp. 126-127 (Dec. 28, 2006).*

Miller, "Google.pedia: The Ultimate Google Resource," Que, pp. 561-565 (Jul. 11, 2006).*

Lowery, et al, Macromedia Dreamweaver MX 2004 Web Application Recipes, p. 15 (Nov. 24, 2003).*

Fejes, Programming Konfabulator Widgets, 10x More Productive Blog (2005).*

U.S. Appl. No. 11/845,703, filed Aug. 27, 2007, Webster.

U.S. Appl. No. 11/951,951, filed Dec. 6, 2007, Tristram.

U.S. Appl. No. 12/062,487, filed Apr. 3, 2008, Webster, et al.

Akeley, et al. "Real-Time Graphics Architecture," downloaded from the internet at http://www.graphics.stanford.edu/courses/cs448a-01-fall, 2001, 20 pages.

Altman, R.B., "Visual Quickstart Guide Power Point 2000/98"Peachpit Press, May 7, 1999, Retrieved from the Internet at http://www.proquest.safaribooksonline.com/0201354411, 7 pages.

Apple Computer, Inc. "Writing a Desk Accessory," Developer Connection, downloaded from the internet at URL: http://developer.apple.com/documentation/mac/devices/devices-16.html on Jan. 3, 2006, 3 pages.

Cadiz, et al., "Sideshow: Providing Peripheral Awareness of Important Information," Technical Report MSR-TR-2001-83, Sep. 14, 2001, downloaded from the internet at ftp://ftp.research.microsoft.com/pub/tr/tr-2001-83.pdf, 9 pages.

Casteller, "International Search Report", European Patent Office, PCT/US2005/008805, Aug. 8, 2005, 3 pages.

Chanda, "Reusable Components from a Remote Source", Pending U.S. Appl. No. 12/062,487, filed Apr. 3, 2008, 35 pages, to be published by USPTO.

Conner, et al. "Three-Dimensional Widgets" ACM Proceedings of the 1992 symposium on Interactive 3D graphics, Special Issue of Computer Graphics, vol. 26, 1992, pp. 183-188, 230-231 *8 pages).

DelChiaro, "International Search Report", European Patent Office, PCT/US2005/008804, Jul. 27, 2005, 3 pages.

Desktop Sidebar, "Desktop Sidebar Home Page", downloaded from the internet at http://webarchive.org/web/20040101160831/http://www.desktopsidebar.com/, on May 11, 2007, 5 pages.

Elliott, "Programming Graphics Processors Functionally," Proceedings of the 2004 Haskell Workshop, Sep. 22, 2004. 11 pages.

Farrand, et al. "Common Elements in Today's Graphical User Interfaces: The Good, the Bad, and the Ugly," Proceedings of the Interchi '93, Human Factors in Computing Systems, 1993, pp. 470-473.

Fried, "Developer Calls Apple's Tiger a Copycat," CNET News.com, Jun. 28, 2004, downloaded from the internet at http://zdnet.com.com/2102-1104_2-5250692.html?tag=printthis on Jul. 1, 2004, 2 pages.

Fried, "For Apple's Tiger, the Keyword is Search", CNET News.com, Jun. 28, 2004, downloaded from the internet at http://zdnet.com.com/2102-1103_2-5250346.html?tag=printthis on Jul. 1, 2004, 2 pages.

Friedman, et al. "Dashboard Blog Dec. 4, 2003", downloaded from the internet at http://www.nat.org/dashboard/blog.php3, on May 11, 2007, 31 pages.

Gruber, "Dashboard vs. Konfabulator", Jun. 2004, downloaded from the interne at http://daringfireball.net/2004/06/dashboard_vs_konfabulator, on May 11, 2007, 9 pages.

Haeberli, et al., "The Accumulation Buffer: Hardware Support for High-Quality Rendering," Computer Graphics, vol. 24, No. 4, Aug. 1990, pp. 309-318.

Konfabulator, "Cupertino, Start your Photocopiers!," Retrieved from the internet at http://www.konfabulator.com, on Jul. 1, 2004, 1 page.

Konfabulator, "Konfabulator & Widget Basics," Retrieved from the Internet at http://www.konfabulator.com/info/basics.html, on Jul. 1, 2004, 3 pages.

Konfabulator, "Screenshots," Retrieved from the Internet at http://www.konfabulator.com/info/screenshots.html on Jul. 1, 2004, 2 pages.

Konfabulator, "What is Konfabulator?," Retrieved from the Internet at http://www.konfabulator.com/info/, on Jul. 1, 2004, 3 pages.

Lammers, et al., "Maya 4.5 Fundamentals: Chapter 13, Particle Systems and Dynamics", New Riders Publishing, 2002, 12 pages.

Nvidia, "Teaching Cg," , downloaded from the internet at http://developer.nvidia.com/docs/io/4106/Teaching-Cg.pdf, to be published by the USPTO, 16 pages.

Puder, "Extending Desktop Applications to the Web," ACM International Conference Proceedings Series, Proceedings of the Jun. 2004 International Symposium on Information and Communication Technologies, 2004, vol. 90, pp. 8-13 (6 pages).

Segal, et al. "The OpenGL Graphics System: A Specification (Version 1.5)," downloaded from the internet at http://www.opengl.org/documentation/specs/version1.5/glspec15.pdf, 2003, 333 pages.

Shantzis, Michael A., "A Model for Efficient and Flexible Image Computing," ACM Proceedings of the 21st annual conference on Computer graphics and interactive techniques, 1994, pp. 147-154.

Shiozawa, Hidekazu et al., "Perspective Layered Visualization of Collaborative Workspaces," Proceedings of the International ACM SIGGROUP conference on Supporting Group Work, 1999, pp. 71-75.

Snippet Software Inc. et al. "Corporate Portal Newsletter: Product Spotlight Non-Browser Based Portal Solution from Snippets Software, Inc.", vol. 1, No. 10, Oct. 2000 downloaded from the internet at http://web.archive.org/web/20010603050951/www.snippets.com/download/Corporate_Portal_Article.pdf, on Jul. 22, 2008, 3 pages.

Snippet Software Inc. et al. "Snippets Software" downloaded from the internet at http://www.snippets.com/, on Jun. 11, 2001, 16 pages.

Staples, "Representation in Virtual Space: Visual Convention in the Graphical User Interface", ACM Proceedings of the INTERACT '93 and CHI '93 Conference on Human Factors in Computing Systems, 1993, pp. 348-354 and 542 (8 pages).

Stardock Corporation "DesktopX Whitepaper and users Guide Version 2" downloaded from the internet at www.stardock.net/media/whitepaper_desktopx.html, on May 14, 2007, 72 pages.

Tang, et al., "ConNexus to Awarenex: Extending Awareness to Mobile Users," ACM Proceedings of the SIGCHI conference on Human factors in computing systems, 2001, pp. 221-228 (8 pages).

Triest, "International Search Report and Written Opinion", European Patent Office, PCT/US2005/022152, Jul. 10, 2006, 8 pages.

Tristram, "System and Method for Generating an Application Fragment", Pending U.S. Appl. No. 11/951,951, filed Dec. 6, 2007, 29 pages, to be published by USPTO.

Ullenboom, "Java ist auch eine Insel," downloaded from the internet at http://www.galileocomputing.de/openbook/javainsel2//java_140000.htm#Xxx998138, on Apr. 13, 2006, 3 pages.

Van Gelder, et al. "Direct Volume Rendering with Shading via Three-Dimensional Textures," ACM Proceedings of the 1996 symposium on Volume visualization, 1996, 9 pages.

Vieira, "International Search Report and Written Opinion", European Patent Office, PCT/US2005/022579, 15 pages.

W3C, "Objects, Images and Applets," Feb. 10, 2003, Retrieved from the Internet at http://www.web.archive.org/web/20030210154019/http://www.w3.org/TR/REC-html140/struct/objects.html, 21 pages.

Wardell, "Konfabulator for Windows", downloaded from the internet at URL: http://www.xpthemes.com/forums.asp?MID=19&CMID=19&AID=4472, on Jan. 10, 2004, 6 pages.

Wikipedia, "Comparison of Widget Engines", downloaded from the internet at http://en.wikipedia.org/wiki/Comparison_of_widget_engines, on May 11, 2007, 6 pages.

Wikipedia, "Windows Sidebar", downloaded from the internet at http://en.wikipedia.org/wiki/Windows_Sidebar, on May 11, 2007, 2 pages.

Daniel et al., "Mashing Up Context-Aware Web Applications: A Component-Based Development Approach," WEB Information Systems Engineering—Wise 2008; Lecture Notes in Computer Science, vol. 5175, pp. 250-263, XP019103131 (2008).

Grolaux et al., "Attach Me, Detach Me, Assemble Me Like You Work," Human-Computer Interaction—Interact 2005, Lecture Notes in Computer Science; LNCS Springer, Berlin DE, vol. 3585, pp. 198-212, XP019018979 (Jan. 1, 2005).

Streitz et al., "i-Land: An Interactive Landscape for Creativity and Innovation," CHI 1999 Conference Proceedings Human Factors in Computing System. Pittsburg, PA, pp. 120-127, XP000894211 (May 15-20, 1999).

Thomas, Roger, Authorized Officer, European Patent Office, in PCT International Application No. PCT/US2008/074059, the International Search Report & Written Opinion, mailed Jan. 23, 2009, 50 pages.

Carciofi, Authorized Officer, "International Search Report and Written Opinion", Patent Cooperation Treaty, PCT/US2009/033114, dated May 7, 2009, 12 pages.

Lambert, International Search Report and Written Opinion dated Mar. 24, 2009 for International Application No. PCT/US2008/078496, filed Jan. 10, 2008 (30 pages).

O'Conner John, "Creating Extensible Applications with the Java Platform," Sun Java Technical Articles [Online] Sep. 2007, retrieved from the Internet: URL:http://java.sun.com/developer/technicalArticles/javase/extensible/ [retrieved on Apr. 27, 2009], 10 pages.

Adobe Systems Incorporated, "Adobe GoLive, Version 6.0," downloaded from the internet at www.adobe.com/golive, 2002, 4 pages.

Adobe Systems Incorporated, "A Manager'Introduction to Adobe eXtensible Metadata Platform, The Adobe XML Metadata Framework" White Paper, 2001, 18 pages.

Adobe Systems Incorporated, "Embedding XMP Metadata in Application Files (Draft)," Sep. 14, 2001, 16 pages.

Adobe Systems Incorporated, "Extensible Metadata Platform (XMP)," downloaded from the internet at www.adobe.com/products/smp/main.html on Apr. 12, 2003, 2 pages.

Adobe Systems Incorporated, "XMP—Extensible Metadata Platform, Version 1.5," Sep. 14, 2001, 88 pages.

Beged-Dov, et al. "RDF Site Summary (RSS) 1.0", downloaded from the internet at http://web.resources.org/rss/1.0/spec on Apr. 15, 2003, 23 pages.

Gellersen, et al. "WebComposition: An Object-Oriented Support System for the Web Engineering Lifecycle", Proceedings of WWW6, 1997, 11 pages.

IDEAlliance, Inc., "PRISM: Publishing Requirements for Industry Standard Metadata, Version 1.2(e), First Public Draft," Sep. 4, 2002, 95 pages.

IDEAlliance, Inc., " Information and Content Exchange, An SML Based Distribution Protocol," 2002, downloaded from the internet at http://www.icestandard.org/servlet/RetrievePage?site=ice&page=aboutice on Feb. 5, 2003, 7 pages.

Interwoven, Inc., "XML in a Content Infrastructure: Conducting Business on the Web", copyright 2001, Interwoven, Inc., 21 pages.

Microsoft Corporation, "Microsoft SharePoint Portal Server 2001; Architecting Web Parts for Business Applications—(prepared in conjunction with Avanade) White Paper," Jun. 2001, 11 pages.

Wikipedia "AppleScript", downloaded from the internet at http://en.wikipedia.org/wiki/AppleScript on Dec. 11, 2007, 8 pages.

W3C, "HTML 4.01 Specification, W3C Recommendation Dec. 24, 1999", downloaded from the internet at http://www.w3.org/TR/html14/ on Apr. 16, 2003, 453 pages.

W3C, "Resource Description Framework (RDF) Model and Syntax Specification, W3C Recommendation Feb. 22, 1999", downloaded from the internet at http://www.w3.org/TR/1999/REC-rdf-syntax-19990222/ on Apr. 15, 2003, 56 pages.

W3C, The Information and Content Exchange (ICE) Protocol, w3C Note Oct. 26, 1998:, downloaded from the internet at http://www.w3.org/TR/NOTE-ice.html on Apr. 15, 2003, 129 pages.

W3C, XSL Transformations (XSLT) Version 1.0, W3C Recommendation Nov. 16, 1999, downloaded from the internet at http://www.w3.org/TR/xslt W3C Recommendation Nov. 16, 1999, 90 pages.

W3C "XHTML™ 1.0 The Extensible HyperText Markup Language (Second Edition), A Reformulation of HTML 4 in XML 1.0, W3C Recommendation Jan. 16, 2000, revised Aug. 1, 2002", downloaded from the internet at http://www.w3.org/TR/xhtml1/ on Apr. 16, 2003, 26 pages.

Honda, Masahi, Authorized Officer, PCT International Application No. PCT/US2008/074059, filed Aug. 22, 2008, in International Preliminary Report on Patentability, mailed Mar. 11, 2010, 7 pages. [is cumulative of Thomas, Roger, Authorized Officer, European Patent Office, in PCT International Application No. PCT/US2008/074059, the International Search Report & Written Opinion, mailed Jan. 23, 2009, 50 pages].

U.S. Patent Office, U.S. Appl. No. 12/062,487, Filed Apr. 3, 2008, in Office Action dated Sep. 7, 2010, 30 pages.

Honda, Masahi, Authorized Officer, PCT International Application No. PCT/US2008/074059, filed Aug. 22, 2008, in International Preliminary Report on Patentability, mailed Mar. 11, 2010, 7 pages.

* cited by examiner

REUSING COMPONENTS IN A RUNNING APPLICATION

BACKGROUND

The present disclosure relates to identifying reusable components in an existing application, and to systems and methods for inserting a reusable component into a separate application, such as an application that is under development.

The development of software applications has seen many advances since the inception of computing. For example, low-level languages utilized constructs that were very closely related to the hardware of the computing system on which programs were executed. The creation of high-level programming languages provided tools that were more abstract than corresponding low-level programming languages and delivered greater portability across different platforms. High-level programming languages also permitted programmers to express operations in terms of variables, mathematical formulas, and Boolean expressions, rather than memory addresses and registers.

The development of object-oriented programming concepts and object-oriented languages, such as C++, further permitted programmers to modularize software applications. Object-oriented programming emphasizes concepts including encapsulation, inheritance, and modularity. Specific purpose modules can be created using object-oriented techniques, such that the modules receive input from and/or provide output to one or more other modules. Additionally, separate modules in a program can be configured to communicate by passing data organized in accordance with constructs, such as classes, subclasses, and objects. Once created, such specific purpose modules can be reused in other programs by copying the source code and associated definitions.

Java further expanded the principles of object-oriented programming by introducing the concept of a virtual machine, which makes it possible to execute an application in a platform-independent environment. Once configured, the virtual machine exists as an environment above the operating system and the computing platform in which an application executes. Because a virtual machine can operate on a variety of computing platforms, an application can be executed in the virtual machine on any of the supported platforms without requiring customization. Thus, an application can be generated for use with a virtual machine such that the application is reusable across a variety of separate computing platforms.

Programming tools, or integrated development environments (IDEs), still further enhanced the ability of programmers to efficiently develop software applications. A programming tool can be used to prototype, code, debug, and maintain one or more software applications. Further, IDEs often include a graphical programming environment, in which features can be at least partially configured through the use of graphical tools. IDEs also can include a palette of standard components, such as controls and displays, that can be inserted into an application without having to be independently developed. Additionally, IDEs provide the ability to analyze and modify an existing application for which the source code is available.

SUMMARY

This specification describes technologies relating to reusing one or more components included in an existing application. An existing application, such as an application executing within the context of an application environment, can be configured to identify one or more reusable components included in the application. For example, a reusable component can be displayed such that it is visually distinguishable from the non-reusable components of an application, including through highlighting, low-lighting, outlining, shading, or any other such visual indication. Further, a reusable component can be inserted into a separate application that is being executed within the same application environment. The application environment can be configured such that a reusable component included in an existing application, the source application, can be selected and transferred to a target application through a graphical user interface command, such as a drag-and-drop operation. Additionally, the reusable component can be automatically inserted into the target application in response to being "dropped" in a display space associated with the target application.

The present inventor recognized the need to permit switching a running application into a mode that facilitates reuse of one or more components. Further, the present inventor recognized the need to automatically insert instructions associated with a reusable component into the code of a target application into which the reusable component is transferred. In order to facilitate reuse of components, the present inventor recognized that it was beneficial to permit an application developer to designate a component as reusable, such as by setting a flag or variable to a particular value.

The present inventor also recognized the need to permit a developer to retain some level of control over the reusability of a component, including the ability to restrict the degree to which a component can be modified and to require that a license be taken in order to use the component. Further, the present inventor recognized the need to prevent a component from being reused. Accordingly, the systems and apparatus described here can implement methods for identifying and sharing one or more reusable components between a plurality of applications.

In general, in one aspect, the subject matter can be implemented to include executing a source application in an application environment; presenting a reusable component in a source application window corresponding to the source application, wherein the reusable component is visibly distinguishable from one or more non-reusable components displayed in the source application window; receiving input selecting the reusable component in the source application window and adding the reusable component to a target application window corresponding to a target application; and inserting one or more computer-readable instructions associated with the reusable component into the target application.

The subject matter also can be implemented such that the received input comprises a drag-and-drop operation. The subject matter further can be implemented to include receiving input activating a reuse function associated with the source application. Also, the subject matter can be implemented such that the reusable component is presented in the source application window only when the reuse function is active. Additionally, the subject matter can be implemented such that the reusable component is visibly distinguishable from one or more non-reusable components displayed in the source application window only when the reuse function is active.

The subject matter also can be implemented to include determining that a data input included in the reusable component is unassigned; identifying a second component in the target application window that includes an unassigned data output; and establishing in the target application a connection between the data input included in the reusable component and the data output included in the second component. The subject matter further can be implemented to include receiving input from a user confirming the connection between the data input included in the reusable component and the data output included in the second component. Additionally, the subject matter can be implemented such that the reusable component is visibly distinguishable from one or more non-reusable components based on a display attribute associated with the reusable component comprising at least one of highlighting, shading, an enhanced border, and a glow effect.

In general, in another aspect, the techniques can be implemented as a computer program product, encoded on a computer-readable medium, operable to cause data processing apparatus to perform operations comprising executing a source application in an application environment; presenting a reusable component in a source application window corresponding to the source application, wherein the reusable component is visibly distinguishable from one or more non-reusable components displayed in the source application window; receiving input selecting the reusable component in the source application window and adding the reusable component to a target application window corresponding to a target application; and inserting one or more computer-readable instructions associated with the reusable component into the target application.

Further, the subject matter can be implemented such that the received input comprises a drag-and-drop operation. The subject matter also can be implemented to be operable to cause data processing apparatus to perform operations comprising receiving input activating a reuse function associated with the source application. Also, the subject matter can be implemented such that the reusable component is presented in the source application window only when the reuse function is active. Additionally, the subject matter can be implemented such that the reusable component is visibly distinguishable from one or more non-reusable components displayed in the source application window only when the reuse function is active.

The subject matter also can be implemented to be further operable to cause data processing apparatus to perform operations comprising determining that a data input included in the reusable component is unassigned; identifying a second component in the target application window that includes an unassigned data output; and establishing in the target application a connection between the data input included in the reusable component and the data output included in the second component. Additionally, the subject matter can be implemented to be further operable to cause data processing apparatus to perform operations comprising receiving input from a user confirming the connection between the data input included in the reusable component and the data output included in the second component. The subject matter further can be implemented such that the reusable component is visibly distinguishable from one or more non-reusable components based on a display attribute associated with the reusable component comprising at least one of highlighting, shading, an enhanced border, and a glow effect.

In general, in another aspect, the subject matter can be implemented as a system including a source application stored on a computer-readable medium and a computing system including processor electronics configured to perform operations comprising executing the source application in an application environment; presenting a reusable component in a source application window corresponding to the source application, wherein the reusable component is visibly distinguishable from one or more non-reusable components displayed in the source application window; receiving input selecting the reusable component in the source application window and adding the reusable component to a target application window corresponding to a target application; and inserting one or more computer-readable instructions associated with the reusable component into the target application.

The subject matter also can be implemented such that the received input comprises a drag-and-drop operation. Further, the subject matter can be implemented such that the processor electronics are further configured to perform operations comprising receiving input activating a reuse function associated with the source application. Also, the subject matter can be implemented such that the reusable component is presented in the source application window only when the reuse function is active. Additionally, the subject matter can be implemented such that the reusable component is visibly distinguishable from one or more non-reusable components displayed in the source application window only when the reuse function is active.

The subject matter also can be implemented such that the processor electronics are further configured to perform operations comprising determining that a data input included in the reusable component is unassigned; identifying a second component in the target application window that includes an unassigned data output; and establishing in the target application a connection between the data input included in the reusable component and the data output included in the second component. Additionally, the subject matter can be implemented such that the processor electronics are further configured to perform operations comprising receiving input from a user confirming the connection between the data input included in the reusable component and the data output included in the second component. Further, the subject matter can be implemented such that the reusable component is visibly distinguishable from one or more non-reusable components based on a display attribute associated with the reusable component comprising at least one of highlighting, shading, an enhanced border, and a glow effect.

Particular embodiments of the subject matter described in this specification can be implemented to realize one or more of the following advantages. For example, the subject matter can be implemented to transfer or otherwise copy a reusable component from a source application into a target application without having to manually access the source code associated with the reusable component. Further, the subject matter can be implemented such that a reusable component can be dragged from a running application and dropped into an application that is being developed, including new applications and applications that are being revised. The subject matter also can be implemented to share both low-level components, such as controls, and high-level components, such as complex widgets and tools. Additionally, the subject matter can be implemented to permit restricting the degree to which a reusable component can be shared and modified, such as through licensing or "read-only" protections.

This subject matter can be implemented using an apparatus, a method, a system, a computer program product, or any combination of an apparatus, methods, systems, and computer program products. The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
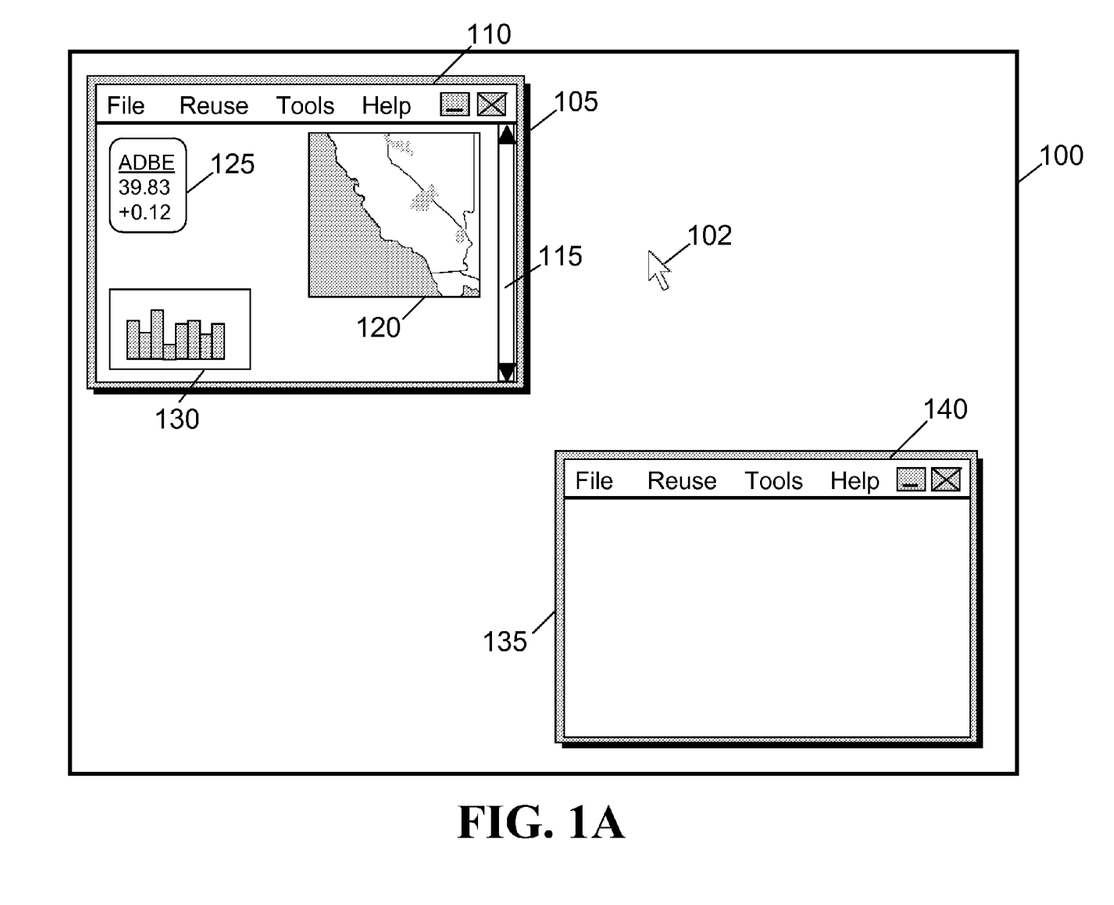
FIGS. 1A-1C show an exemplary interface that can be used to share one or more reusable components between two or more applications.

FIG. 1A shows an exemplary interface that can be used to share one or more reusable components between two or more applications. A reusable component is an element of a computer program, which includes one or more instructions that implement one or more functions, where the computer program component can be extracted from one application program and used again to construct a new application program. An application from which a reusable component is shared is referred to as a source application and an application into which a reusable component is inserted is referred to as a target application. Further, the one or more source applications and one or more target applications between which reusable components can be shared are associated with a common application environment. In an implementation, the application environment can be a cross-operating system runtime, such as Adobe® Integrated Runtime offered by Adobe Systems Incorporated of San Jose, Calif.

The interface can be presented in a graphical user interface ("GUI") environment, such as a desktop 100 presented by an operating system or the application environment. The desktop 100 can be configured to permit launching one or more applications (or "computer programs"). Further, the desktop 100 can permit a user to interact with an application through one or more inputs and controls, including graphical controls. For example, a user can control a cursor 102 displayed in the desktop 100 through a physical input device, such as a mouse or trackball, and enter commands to perform one or more operations.

A source application executing in the application environment can be represented in the desktop 100 by a source application window 105. The source application window 105 can include a command menu 110 that lists a plurality of commands associated with functions that can be performed by the source application. For example, the command menu 110 can include a plurality of menu titles, each of which corresponds to a list of one or more options and sub-menus. The command menu 110 also can include one or more command buttons associated with specific functions, such as minimizing or closing the source application window 105. Further, the command menu 110 can be implemented as a reusable component.

The source application also can include a scroll bar 115 that allows for the selective display of the source application window 105. The scroll bar 115 also can be implemented as a reusable component. Additionally, one or more other components associated with the source application can be displayed in the source application window 105. For example, a weather monitor 120 can be configured to display the current weather conditions for a particular region of the terrestrial globe. The weather monitor 120 also can be configured to present other information, such as time, temperature, and forecast data. The information presented by the weather monitor 120 can be collected from one or more data sources, including remote data sources. Further, a stock ticker 125 can be configured to present quotes for one or more securities or indexes. Similar to the weather monitor 120, the stock ticker 125 also can be configured to retrieve quote data from one or more data sources, including remote data sources. Additionally, a monitor 130 can be displayed in the source application window 105. The monitor 130 can provide a graphical representation of the values associated with a data source. For example, the monitor 130 can provide a visual representation of sound being received through a microphone that is connected to the computing platform on which the source application is hosted or sound data stored in an electronic file.

A target application can be represented in the desktop 100 by a target application window 135. The target application can be a newly created (or "blank") application that is being developed. In an implementation, a blank application can be created by selecting a New Application option from a menu, such as a command menu 140. A blank application also can be created by selecting a New Application option from a context menu, such as a menu displayed in response to right clicking in an existing application executing within the application environment or the desktop 100. Further, the blank application can be configured in accordance with an application template and then launched within the application environment as an executing application. Alternatively, the target application can be an existing application that is being modified.

In an implementation, any existing application can be modified unless it has been locked to prevent further modifications. The command menu 140 can be configured to list a plurality of commands associated with functions that can be performed by the target application. If the target application is a newly created application, the command menu 140 can include standard functions, such as save, exit, and help. As functionality is added to the target application, such as through the addition of one or more components, the command menu 140 can be expanded to include options and sub-menus associated with the expanded functionality. In an implementation, the command menu 140 also can be modified through the use of an application development tool.

Figure 1B:
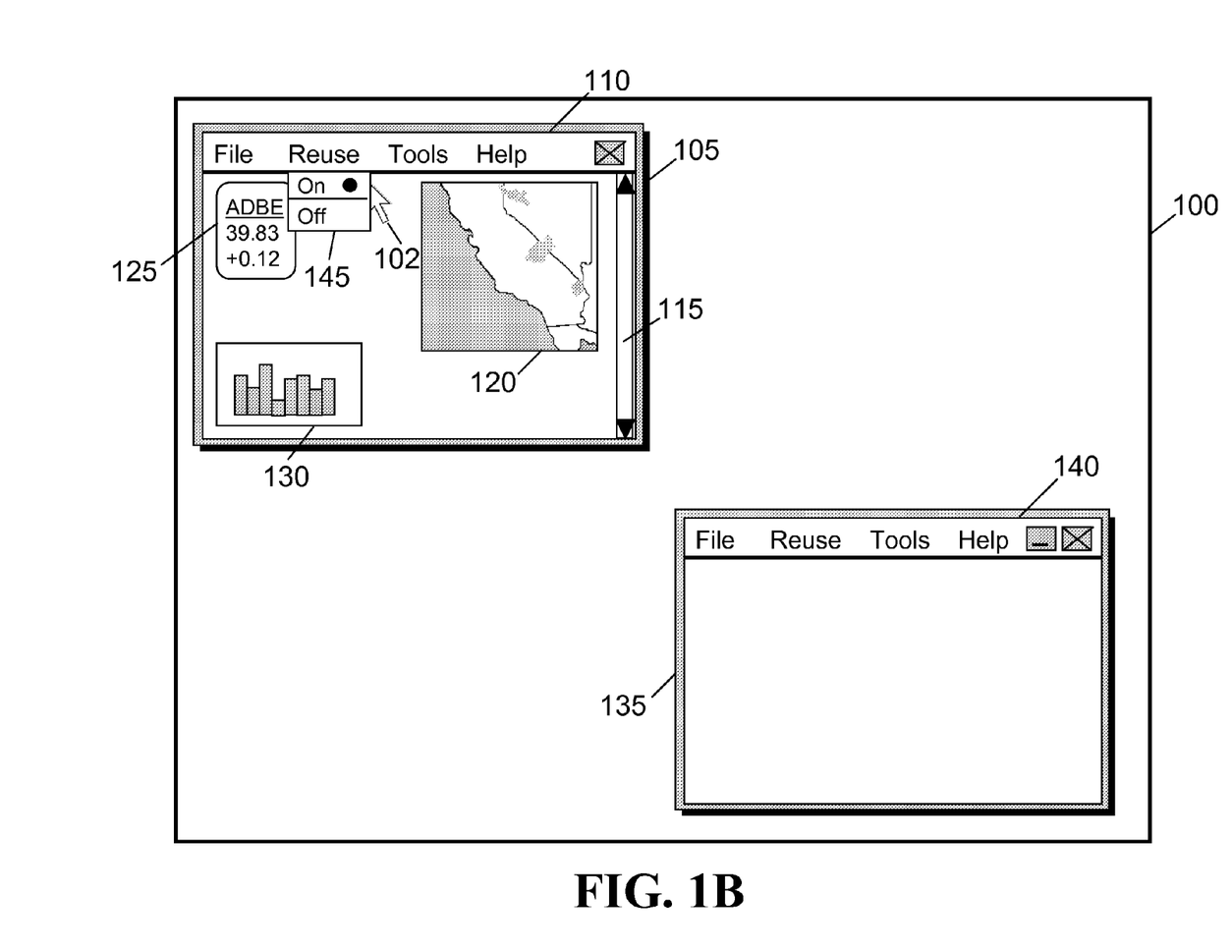

FIG. 1B shows an example of selecting the reuse menu 145 in the command menu 110 of the source application window 105. The reuse menu 145 can be selected by positioning the cursor 102 in proximity to the reuse menu 145 and entering a command through a physical control device, such as a button push on a mouse. Alternatively, the reuse menu 145 can be selected through entry of a predetermined command, such as a function key or key-combination on a keyboard. The reuse menu 145 is configured to permit a user to turn the reuse function of the application on and off. Further, the reuse menu 145 presents a visual indicator to identify the presently selected menu option, such as a marker displayed adjacent to the selected option or by visually distinguishing the text used to represent the selected option. Alternatively, the reuse menu can be presented such that only the current option is displayed and selecting the current option causes it to be toggled (e.g., from "OFF" to "ON").

When the reuse function is turned off, the source application performs routine operations, such as executing the functions associated with one or more components included in the source application. When the reuse function is turned on, the source application identifies the components that are available for reuse. A reusable component included in the source application can be identified through a wide variety of cues, including visual and/or auditory cues provided through the interface. In an implementation, turning the reuse function on also enables the drag-and-drop functionality that can be used to insert a reusable component into a target application.

Further, a source application can be configured such that turning on the reuse function inhibits interaction with reusable components for functions other than insertion into a target application. For example, when the reuse function is turned on in a source application, command interfaces associated with a reusable component can be disabled. Thus, selecting a button included in a reusable component will not produce a button "click" event or initiate the corresponding functionality that results when the reuse function is turned off. Additionally, interaction with non-reusable components included in a source application can be inhibited when the reuse function is turned on. For example, a movie player can be configured to continue playing, but associated controls such as pause and rewind can be disabled so that the movie player is inert.

Figure 1C:
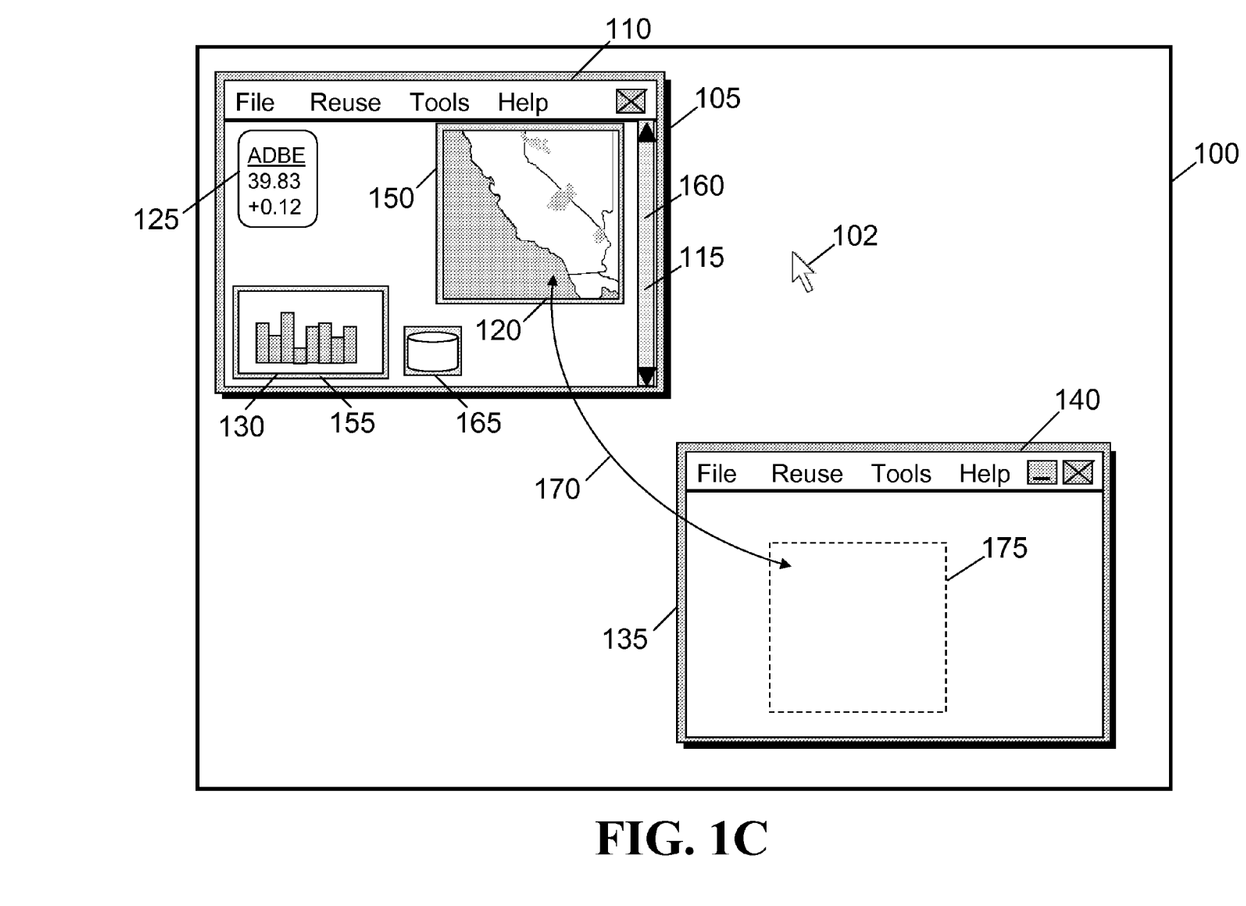

FIG. 1C shows an exemplary interface presented in the desktop 100 when the reuse function is turned on. A visual indicator can be associated with one or more reusable components to distinguish them from other portions of the source application, including components that are not reusable. For example, a visible border can be display around a reusable component, such as the border 150 displayed around the weather monitor 120 or the border 155 displayed around the monitor 130. The visible border can be displayed to create a defined border around a reusable component that includes a different color or texture than the presentation of a non-reusable component included in the same window. Alternatively, the visible border can be presented as a "glow" or "halo" effect that surrounds the reusable component.

Further, the visible border can be displayed persistently, or can be displayed intermittently in response to an interface event, such as in response to a cursor coming within a predetermined range of a reusable component. In an implementation, non-reusable components can be visually distinguished from reusable components by diminishing their visual presentation in the application window, such as by fading or graying the non-reusable components. Diminishing the visual presentation of non-reusable components can be performed in conjunction with or instead of enhancing the visual presentation of reusable components, such as through the use of a visible border. Interface components and controls also can include a visible border if they are reusable. For example, the scroll bar 115 can include a visible border 160 to indicate that it is a reusable component. Alternatively, interface components can be highlighted or shaded to indicate that they are reusable.

Additionally, reusable components that generally do not have an associated visual presentation can be represented by an icon when the reuse function is turned on. For example, when reuse is turned on through the reuse menu 145 of the source application, a database icon 165 can be presented in the source application window 105. The database icon 165 can be used to represent a data source accessible to the source application that does not have a visual representation when the reuse function is turned off. Further, the database icon 165 can be presented with a visible border indicating that it is reusable. In some implementations, a reusable component can be identified by a audible indicator in conjunction with a visual indicator. For example, a distinctive sound can be presented to identify a reusable component in response to an interface event, such as a cursor coming within a predetermined range of the reusable component.

A reusable component can be "grabbed" in the interface, such as through the use of a cursor controlled by a mouse. Once grabbed, the reusable component can be inserted into another application through a drag-and-drop operation. For example, the weather monitor 120 can be grabbed in the source application window 105 and dragged 170 across the interface to the target application window 135. By dropping the weather monitor 120 in the target application window 135, a new weather monitor 175 is inserted into the target application.

The weather monitor 175 generated through the drag-and-drop operation incorporates all of the functionality of the weather monitor 120 in the source application, including all of the presently selected configuration settings. Thus, the weather monitor 175 inserted into the target application can be initialized to a state that corresponds to the state of the weather monitor 120 in the source application when the copy procedure began. For example, the weather monitor 175 inserted into the target application can be configured to present weather data for the same geographical area as the weather monitor 120 associated with the source application.

In some implementations, the functionality of the weather monitor 175 inserted into the target application also can be restricted in accordance with one or more limitations imposed by the developer of the reusable component. Unless restricted, however, the weather monitor 175 can be reconfigured in accordance with the requirements of the target application. In other implementations, a new component generated by inserting a reusable component into a target application can be initialized into a default state, either automatically or in response to input from a user. For example, all of the configuration settings associated with the reusable component can be initialized to default values.

Additionally, a reusable component can be manipulated after it has been inserted into the target application. For example, the weather monitor 175 can be resized, moved, or deleted once it is displayed in the target application window 135. Further, a target application can be modified using one or more development tools, such as by opening or accessing the target application in an IDE. For example, a target application that has been populated with one or more reusable components can be opened as a project in an IDE. In an implementation, a menu item can be selected to generate a project from the target application that can be opened in an IDE.

Further, code corresponding to one or more components included in the target application can be converted, such as into a markup language or ActionScript, to generate a project. In some implementations, source code can be automatically retrieved for one or more components included in a target application when the application is opened as a project. For example, a source code pointer included in a component, such as a URL, can be accessed to retrieve corresponding source code. Alternatively, if a source code pointer is not available, the binary form of the component can be used in the IDE.

Figure 2:
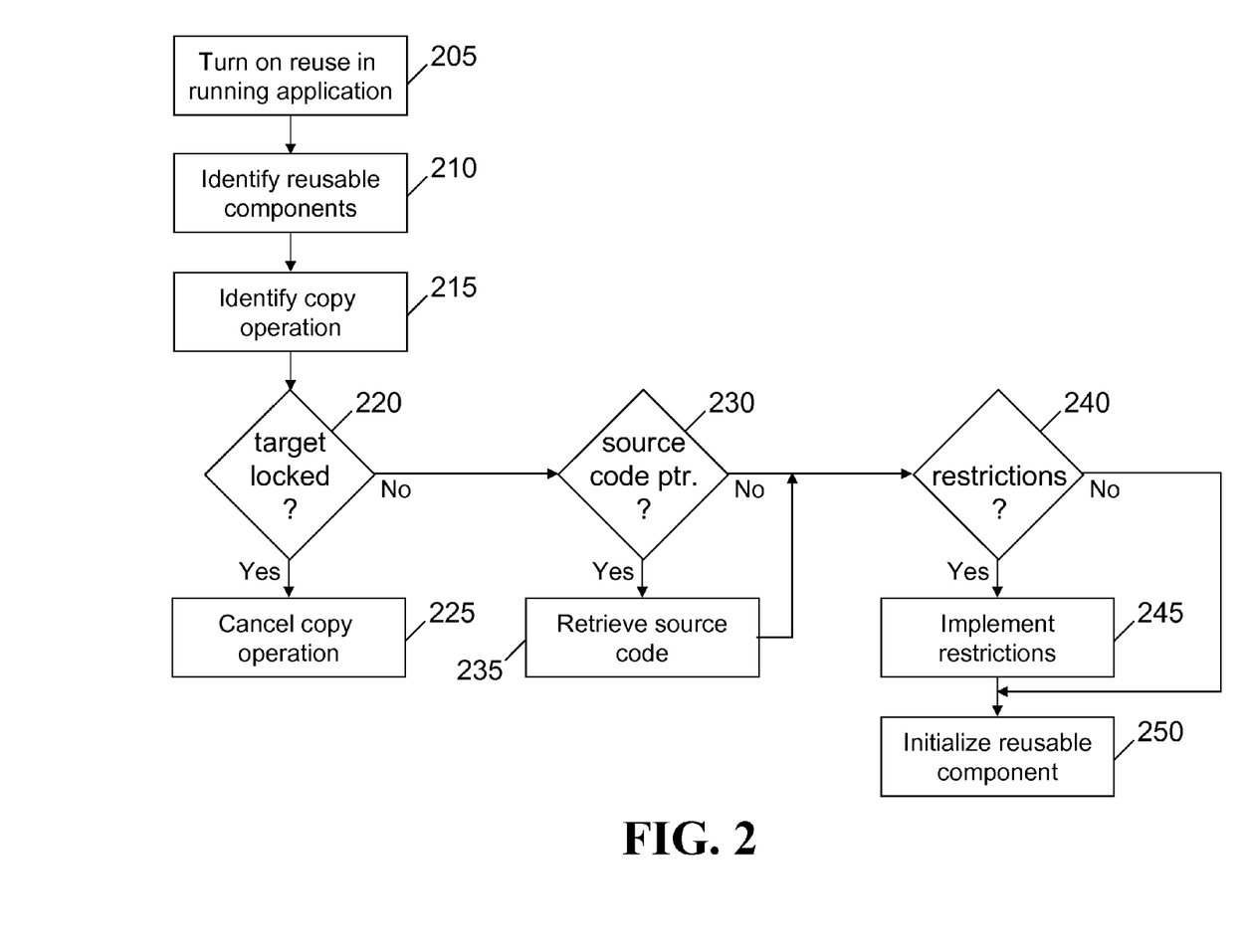
FIG. 2 shows a flowchart describing an exemplary process for inserting a reusable component into an application.

FIG. 2 shows a flowchart describing an exemplary process for inserting a reusable component into an application. A reuse option can be selected in a running application to permit identifying and sharing the reusable components included in that application (205). In some implementations, a reusable component can be shared from a running application only when the reuse option has been selected.

Further, the reusable components included in the running application are identified (210). The application is configured to visual identify each reusable component and to permit each reusable component to be shared with a separate application, such as through a drag-and-drop operation. The components included in the running application can be polled to determine whether they implement reusability. Alternatively, a record of reusable components maintained by the application can be accessed. In an implementation, a component is identified as reusable through a class definition associated with the component. For example, a standard button can belong to the class Button. Further, a developer can create a new sub-class identified as MyButton that extends the class Button. Additionally, the sub-class MyButton can include an interface named Reusable. Thus, a component belonging to the sub-class MyButton can include a reference to the interface, such as "implement Reusable", to indicate that the component is reusable.

Alternatively, the sub-class MyButton can include a reusability flag, such as a Boolean value that indicates the reusability status. A reusable component further can be identified to a user through the presentation of a visual identifier associated with the component, such as highlighting, shading, or a visible border. A reusable component also can be identified by an audible identifier. Further, a component that does not have an associated visual representation in the application window when reuse is not selected can be represented by an object, such as an icon that includes the visual identifier indicating reusability, when reuse is selected. Thus, a user can visually identify all of the reusable components included in an application when a reuse option corresponding to that application has been selected.

Additionally, both low-level components and high-level components can be identified as reusable. For example, low-level interface devices, such as buttons, panels, scroll bars, and text boxes can be reused. Further, high-level components, including specialized widgets and small applications, also can be reused. Thus, one or more components not typically available in the palette of a development tool, such as complex and customized components, can be reused from an existing application.

A copy operation associated with a reusable component can be identified while the source application is running (215). For example, a user can initiate a copy operation by selecting a reusable component included in the source application. Further, the reusable component can be transferred to a target application window through a drag-and-drop operation. Alternatively, one or more other transfer operations also can be performed, such as a copy-and-paste operation or a cut-and-paste operation. The target application can be polled to determine whether it is locked (220). For example, a target application can be set to read-only or can be configured to require authorization before it can be modified. If the target application is locked, the copy operation is canceled (225).

If the target application is not locked, the reusable component can be accessed to determined whether it includes a source code pointer (230). For example, the binary code associated with a reusable component can be copied from the source application during the copy operation. Further, the binary code can be analyzed to determine whether it includes an embedded pointer that identifies a location at which the full source code for the reusable component can be obtained, such as a web site. If a source code pointer is included, the source code can be retrieved (235). Otherwise, the binary code associated with the reusable component is utilized.

Any restrictions associated with the reusable component also are identified (240). If one or more restrictions are associated with the reusable component, the restrictions are implemented (245). The developer or owner of the reusable component can require that one or more conditions for reuse be met, which can be included in the code corresponding to the reusable component. For example, the reusable component can be classified as "read-only", such that no further modifications to the reusable component can be made. A license also can be required before full use of the reusable component is authorized. For example, a reusable component can be licensed for use with a particular application. When the reusable component is invoked, it can determine which application it is operating in and whether it is licensed for use with that application. If a reusable component determines that it is not associated with a licensed application, the reusable component can operate in a trial or demonstration mode. A restricted reusable component also can identify instructions for obtaining a license, such as a source from which a full license can be purchased. Further, the reusable component can display a message indicating that it is in trial mode and/or provide only limited functionality.

If there are no restrictions, or once the restrictions have been implemented, the reusable component can be initialized in the target application (250). Thus, a copy of the reusable component included in the source application is created and initialized, to the extent permitted, in the target application. Additionally, a reusable component can be associated with a library file, which can be accessed by the target application. Thus, a reusable component can include a property that identifies the library file with which it is associated. Alternatively, if the reusable component corresponds only to the target application, the property can have a null value. Once initialized in the target application, the reusable component also can be executed. A reusable component is copied, to the extent permitted, as a complete component. Thus, the reusable component can be configured to be fully functional once it is inserted into the target application.

Figure 3:
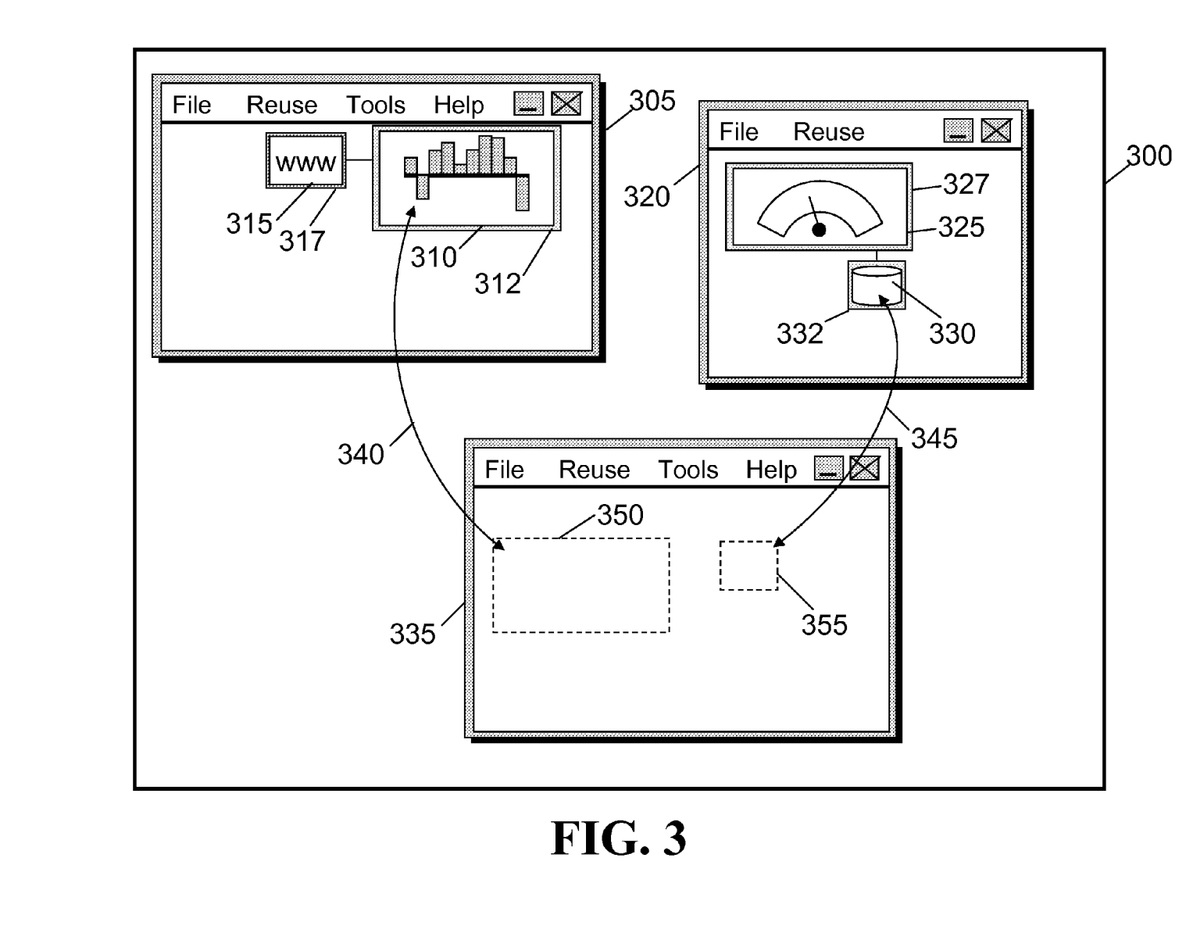
FIG. 3 shows an exemplary interface that can be used to share reusable components included in two or more applications.

FIG. 3 shows an exemplary interface that can be used to share reusable components included in two or more applications. A plurality of applications are presented in a GUI environment, such as a desktop 300 presented by an operating system or an application execution environment. A first source application window 305 associated with a first source application includes a bar graph interface 310 that is configured to present information in a graphical format. The first source application window 305 also includes a world wide web icon 315, which represents a data source for the information presented in the bar graph interface 310. The bar graph interface 310 and the world wide web icon 315 can be displayed in conjunction with visual indicators 312 and 317 respectively, to indicate that they are reusable components.

Further, a second source application window 320 associated with a second source application includes a meter interface 325 that is configured to present information in a graphical format. The second source application window 320 also includes a database icon 330, which represents a data source for the information presented in the meter interface 325. The meter interface 325 and the database icon 330 can be displayed in conjunction with visual indicators 327 and 332 respectively, to indicate that they are reusable components.

Additionally, a target application window 335 can be displayed in the desktop 300. The target application window 335 can be associated with a new application or an existing application for which modification is permitted. The bar graph interface 310 included in the first source application window 305 can be inserted into the target application window 335 through a drag-and-drop operation 340. Upon being dropped into the target application window 335, a new bar graph interface 350 is created in the target application. Similarly, the database icon 330 included in the second source application window 320 can be inserted into the target application window 335 through a drag-and-drop operation 345. Upon being dropped into the target application window 335, a new data source 355 corresponding to the database represented by the database icon 330 is created in the target application.

Additionally, the target application can be configured to detect that the bar graph interface 350 includes an input for which a data source has not been specified. The target application also can determine that the data source 355 includes a data output that is not associated with a corresponding data input in the target application. Thus, the target application can prompt the user to indicate whether the output of the data source 355 is to be connected to the input of the bar graph interface 350. Alternatively, the target application can be configured to automatically form a connection between a component that includes an unassigned data output and a component that includes an unassigned data input. Thus, the output of the data source 355 can be automatically connected to the input of the bar graph interface 350. In another implementation, a user can specify a desired connection between a first component, with a data output, and a second component with a data input, such as by dropping the first component onto the second component.

Figure 4:
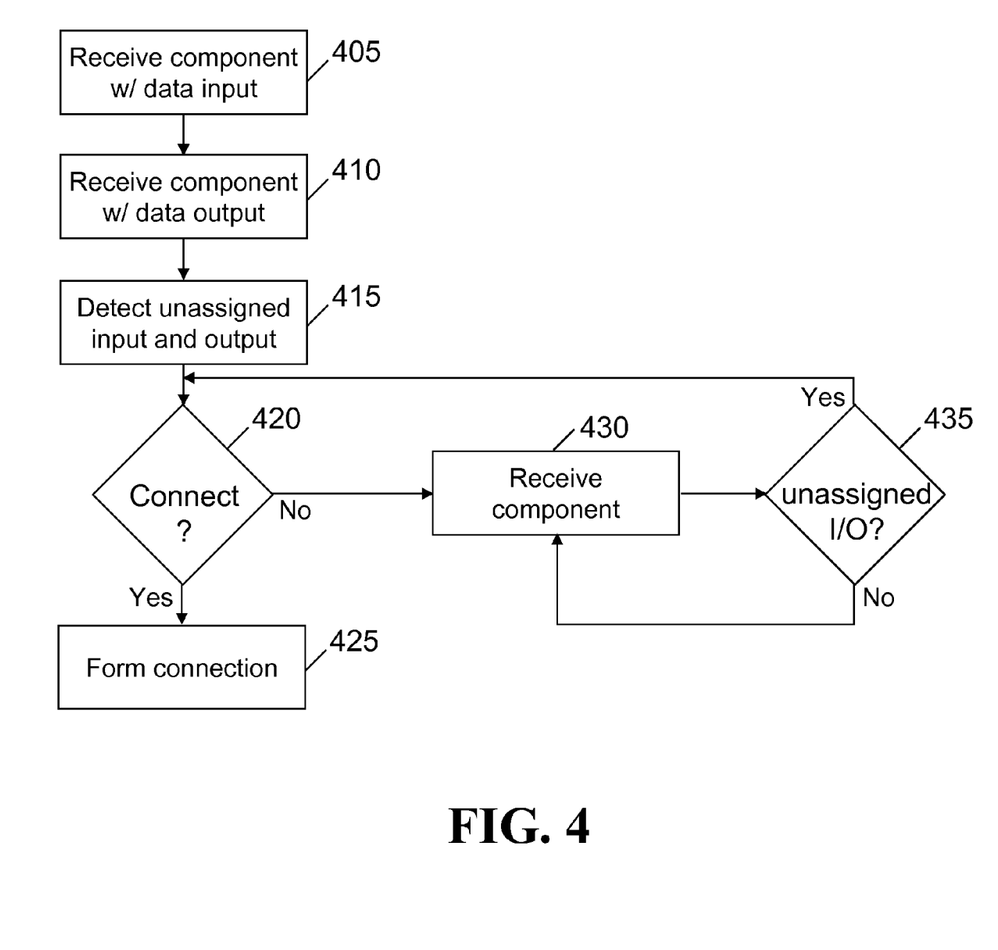
FIG. 4 shows a flowchart describing an exemplary process for associating two reusable components in a target application.

FIG. 4 shows a flowchart describing an exemplary process for associating two reusable components in a target application. A reusable component including an unassigned data input is received in the target application (405). A reusable component including an unassigned data output also is received in the target application (410). The reusable components including the unassigned data input and the unassigned data output can be received in any order. Further, one or more intervening components, or other items, can be received in the target application between receipt of the reusable component including the unassigned data input and receipt of the reusable component including the unassigned data output. Additionally, any period of time can elapse between receipt of the reusable components including the unassigned data input and the unassigned data output.

The target application detects the reusable component that includes the unassigned data input and the reusable component that includes the unassigned data output (415). The target application then queries the user to determine whether the unassigned data output should be connected to the unassigned data input (420). For example, the target application can be configured to present a prompt to the user asking whether output from a first reusable component should be provided as input to a second reusable component. If the user confirms, a connection between the reusable components is formed (425).

Otherwise, a connection is not made and the target application continues to operate until an additional reusable component is received (430). The target application then determines whether the additional reusable component includes an unassigned input or output (435). If the additional reusable component includes an unassigned input or output, the target application queries the user to determine whether a connection should be formed (420). Otherwise, the target application continues to operate until another reusable component is received (430).

Additionally, the target application can be configured to permit a user to reconfigure connections between two components and to form connections between two or more components. In other implementations, the target application can be configured to automatically form a connection between a reusable component that includes an unassigned data input and a reusable component that includes an unassigned data output. Further, the target application can be configured to prompt the user to confirm that the connection is correct.

Figure 5:
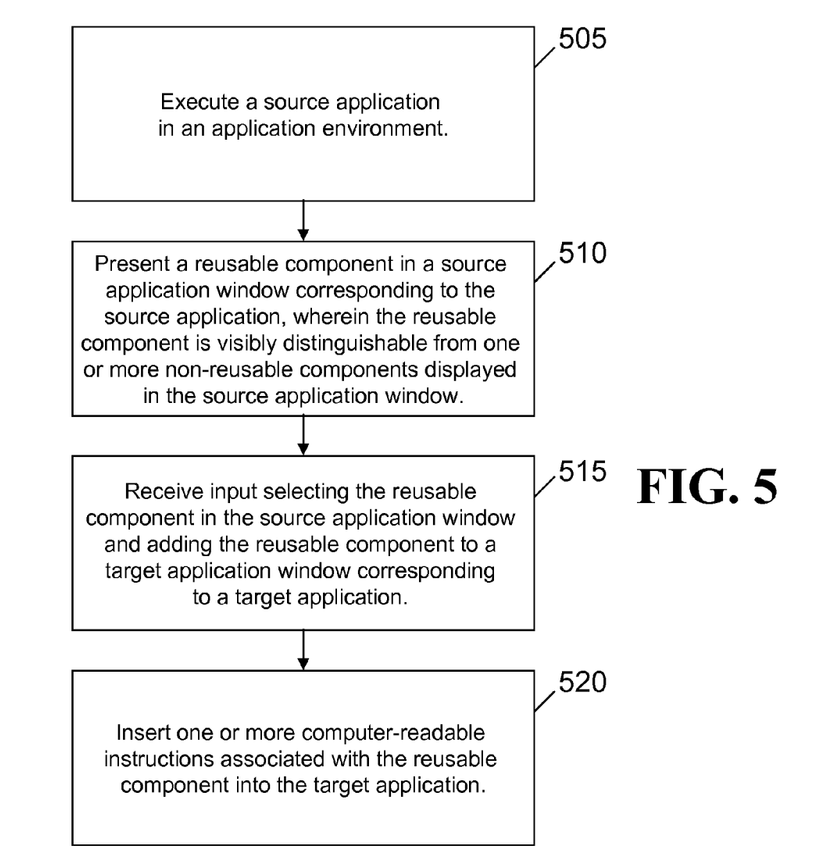
FIG. 5 shows a computer-implemented method of reusing a component.

FIG. 5 shows a computer-implemented method of reusing a component. Initially, a source application is executed in an application environment (505). A reusable component is presented in a source application window corresponding to the source application, wherein the reusable component is visibly distinguishable from one or more non-reusable components displayed in the source application window (510). Input is received selecting the reusable component in the source application window and adding the reusable component to a target application window corresponding to a target application (515). Once the input has been received, one or more computer-readable instructions associated with the reusable component are inserted into the target application (520).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method of reusing a component, the method comprising:
   executing a source application in an application environment;
   presenting an existing instance of a reusable component in a source application window corresponding to the source application;
   receiving first input activating a reuse function associated with the source application;
   in response to receiving the first input, visually distinguishing the existing instance of the reusable component from one or more non-reusable components displayed in the source application window and enabling selection of the existing instance of the reusable component for reuse;
   receiving second input selecting the existing instance of the reusable component in the source application window and adding a new instance of the reusable component corresponding to the existing instance of the reusable component to a target application window corresponding to a target application that executes within the application environment separate from the source application; and
   inserting one or more computer-readable instructions associated with the existing instance of the reusable component into the target application.

2. The computer-implemented method of claim 1, wherein the second received input comprises a drag-and-drop operation.

3. The computer-implemented method of claim 1, further comprising:
   disabling an interaction function associated with the existing instance of the reusable component in response to receiving the first input activating the reuse function; and
   initializing the new instance of the reusable component in the target application using the inserted instructions.

4. The computer-implemented method of claim 1, wherein the existing instance of the reusable component is presented in the source application window only when the reuse function is active.

5. The computer-implemented method of claim 1, wherein the existing instance of the reusable component is visibly distinguishable from the one or more non-reusable components displayed in the source application window only when the reuse function is active.

6. The computer-implemented method of claim 1, further comprising:
   determining that a data input included in the new instance of the reusable component is unassigned;
   identifying a second component in the target application window that includes an unassigned data output; and
   establishing in the target application a connection between the data input included in the new instance of the reusable component and the data output included in the second component.

7. The computer-implemented method of claim 6, further comprising:
   receiving input from a user confirming the connection between the data input included in the new instance of the reusable component and the data output included in the second component.

8. The computer-implemented method of claim 1, wherein the existing instance of the reusable component is visibly distinguishable from the one or more non-reusable components based on a display attribute associated with the existing instance of the reusable component comprising at least one of highlighting, shading, an enhanced border, and a glow effect.

9. A computer program product, encoded on a computer-readable medium, operable to cause data processing apparatus to perform operations comprising:
   executing a source application in an application environment;
   presenting an existing instance of a reusable component in a source application window corresponding to the source application;
   receiving first input activating a reuse function associated with the source application;
   in response to receiving the first input, visually distinguishing the existing instance of the reusable component from one or more non-reusable components displayed in the source application window and enabling selection of the existing instance of the reusable component for reuse;
   receiving second input selecting the existing instance of the reusable component in the source application window and adding a new instance of the reusable component corresponding to the existing instance of the reusable component to a target application window corresponding to a target application that executes within the application environment separate from the source application; and
   inserting one or more computer-readable instructions associated with the existing instance of the reusable component into the target application.

10. The computer program product of claim 9, wherein the second received input comprises a drag-and-drop operation.

11. The computer program product of claim 9, further operable to cause data processing apparatus to perform operations comprising:
   disabling an interaction function associated with the existing instance of the reusable component in response to receiving the first input activating the reuse function; and
   initializing the new instance of the reusable component in the target application using the inserted instructions.

12. The computer program product of claim 9, wherein the existing instance of the reusable component is presented in the source application window only when the reuse function is active.

13. The computer program product of claim 9, wherein the existing instance of the reusable component is visibly distinguishable from the one or more non-reusable components displayed in the source application window only when the reuse function is active.

14. The computer program product of claim 9, further operable to cause data processing apparatus to perform operations comprising:
   determining that a data input included in the new instance of the reusable component is unassigned;
   identifying a second component in the target application window that includes an unassigned data output; and
   establishing in the target application a connection between the data input included in the new instance of the reusable component and the data output included in the second component.

15. The computer program product of claim 14, further operable to cause data processing apparatus to perform operations comprising:
   receiving input from a user confirming the connection between the data input included in the new instance of the reusable component and the data output included in the second component.

16. The computer program product of claim 9, wherein the existing instance of the reusable component is visibly distinguishable from the one or more non-reusable components based on a display attribute associated with the existing instance of the reusable component comprising at least one of highlighting, shading, an enhanced border, and a glow effect.

17. A system comprising:
   a source application stored on a computer-readable medium; and
   a computing system including processor electronics configured to perform operations comprising:
      executing the source application in an application environment;
      presenting an existing instance of a reusable component in a source application window corresponding to the source application;
      receiving first input activating a reuse function associated with the source application;
      in response to receiving the first input, visually distinguishing the existing instance of the reusable component from one or more non-reusable components displayed in the source application window and enabling selection of the existing instance of the reusable component for reuse;
      receiving second input selecting the existing instance of the reusable component in the source application window and adding a new instance of the reusable component corresponding to the existing instance of the reusable component to a target application window corresponding to a target application that executes within the application environment separate from the source application; and
      inserting one or more computer-readable instructions associated with the existing instance of the reusable component into the target application.

18. The system of claim 17, wherein the second received input comprises a drag-and-drop operation.

19. The system of claim 17, wherein the processor electronics are further configured to perform operations comprising:
   disabling an interaction function associated with the existing instance of the reusable component in response to receiving the first input activating the reuse function; and
   initializing the new instance of the reusable component in the target application using the inserted instructions.

20. The system of claim 17, wherein the existing instance of the reusable component is presented in the source application window only when the reuse function is active.

21. The system of claim 17, wherein the existing instance of the reusable component is visibly distinguishable from the one or more non-reusable components displayed in the source application window only when the reuse function is active.

22. The system of claim 17, wherein the processor electronics are further configured to perform operations comprising:

determining that a data input included in the new instance of the reusable component is unassigned;

identifying a second component in the target application window that includes an unassigned data output; and establishing in the target application a connection between the data input included in the new instance of the reusable component and the data output included in the second component.

23. The system of claim 22, wherein the processor electronics are further configured to perform operations comprising:

receiving input from a user confirming the connection between the data input included in the new instance of the reusable component and the data output included in the second component.

24. The system of claim 17, wherein the existing instance of the reusable component is visibly distinguishable from the one or more non-reusable components based on a display attribute associated with the existing instance of the reusable component comprising at least one of highlighting, shading, an enhanced border, and a glow effect.

* * * * *